United States Patent [19]

Halls et al.

[11] Patent Number: 4,882,182

[45] Date of Patent: Nov. 21, 1989

[54] AEROSOL PRODUCT

[75] Inventors: Neil G. Halls; Roderick P. J. Tomlinson, both of Glen Waverley, Australia

[73] Assignee: Soltec Research Pty. Ltd., Australia

[21] Appl. No.: 69,893

[22] Filed: Jul. 6, 1987

[30] Foreign Application Priority Data

Jan. 8, 1987 [AU] Australia .............................. PH9795

[51] Int. Cl.⁴ ............................ A23B 4/14; A23C 3/08
[52] U.S. Cl. .................................... 426/116; 426/324; 426/564; 426/569
[58] Field of Search ................. 426/564, 116, 569, 324

[56] References Cited

U.S. PATENT DOCUMENTS

| | | | |
|---|---|---|---|
| 2,155,260 | 4/1939 | Dillar | 426/317 |
| 2,294,172 | 8/1942 | Getz | 426/317 |
| 3,072,487 | 1/1963 | Webster | 99/60 |
| 3,503,757 | 3/1970 | Rubenstein | 99/136 |
| 3,615,718 | 10/1971 | Weinstein | 99/189 |
| 3,622,354 | 11/1971 | Diamond | 426/116 |
| 3,845,231 | 10/1974 | Nagasawa | 426/393 |
| 3,970,584 | 7/1976 | Hart et al. | 252/305 |
| 4,343,825 | 8/1982 | Takada et al. | 426/570 |
| 4,395,429 | 7/1983 | Campagne et al. | 426/569 |
| 4,571,338 | 2/1986 | Okonogi et al. | 426/329 |

FOREIGN PATENT DOCUMENTS

| | | |
|---|---|---|
| 240641 | 9/1962 | Australia . |
| 268412 | 10/1963 | Australia . |
| 264525 | 4/1964 | Australia . |
| 422391 | 4/1969 | Australia . |
| 453541 | 10/1972 | Australia . |
| 8600196 | 1/1986 | Australia .............................. 426/564 |
| 1196286 | 6/1970 | United Kingdom . |

OTHER PUBLICATIONS

Furia, T. E., CRC Handbook of Food Additives, 2nd ed. vol. 1, CRC Press, Inc., Cleveland, Ohio 1972, pp. 617–649.

Primary Examiner—Marianne Cintins
Assistant Examiner—Helen Pratt
Attorney, Agent, or Firm—Benasutti and Murray

[57] ABSTRACT

An aerosol dispensable composition comprising in combination:
(i) 0.05 to 5% w/w of a frothing agent;
(ii) 0.05 to 75% w/w of a sweetener;
(iii) 0.05 to 10% w/w of a thickener;
(iv) 0.01 to 1% w/w of a preservative;
(v) 0.1 to 10% w/w a phosphate buffer system adapted to maintain the pH of the composition in the range 8.0 to 8.5; and the balance being selected from other excipients, flavors and colorants, propellants and water.

19 Claims, No Drawings

AEROSOL PRODUCT

FIELD OF THE INVENTION

This invention relates to a composition for use in forming milk shake type products.

This invention was conceived as a means for preparing a flavoured thickened foamy milk-based drink as an alternative to the traditional milk shake which was formed by blending milk with syrup powdered flavours and ice-cream in a mechanical blender. It is an object of the invention to provide a similar milk drink using an aerosol dispenser.

The requirements of a product of this type should include (i) compatibility with existing aerosol packaging types in order to minimize manufacturing cost.

(ii) a self life in an unrefrigerated condition of at least twelve months.

(iii) full compliance with food regulations.

(iv) consumer acceptable flavours as attractive as possible.

(v) convenience in use.

(vi) capability of being thickened and frothed in addition to being flavoured.

In order to achieve these objects, it was realized that many constrains existed preventing the formulation of a successful product as discussed below.

Most flavours have a limited shelf life in solution due to oxidation, microbial attack, enzymatic breakdown, etc.

The product should be of a low viscosity initially, so that it can be ejected rapidly from the aerosol can to provide the necessary mixing action. This is not easily achieved because the product needs to be concentrated and the thickeners and viscosity builders required in the composition are also concentrated.

Conventional aerosol cans are not produced to food quality specifications and the lining systems are not able to hold pressurized, low pH liquids for adequate periods of time. However, most food products are packed in liquids at a low pH in order to avoid microbial spoilage.

The necessity to provide preservation of the product in the absence of low pH compositions must be achieved from the narrow range of food approved added preservatives.

The aerosol propellant is normally restricted to noncondensible gases by food regulations in most countries.

Finally food colours are also affected by some of the above parameters and must be properly regulated.

From the above it can be seen that a large number of difficulties stand in the way of providing an acceptable aerosol product.

In PCT/AU/85/00135 an aerosol dispensable composition is disclosed comprising in combination (i) 0.05 to 5% of a frothing agent, (ii) 0.05 to 75% of a sweetener, (iii) 0.05 to 10% of a thickener, (iv) 0.01 to 1% of a preservative, and the balance being other excipients, flavours and colourants, propellants and water. High levels of sweetener are exemplified and believed necessary to maintain bacterial control. This document also discloses the need to maintain the pH in the neutral range, however, the buffer systems disclosed have failed to eliminate pinhole corrosion within relatively short times e.g. less than six months.

A similar approach is disclosed in U.S. Pat. No. 3,622,354 which relates to a product utilizing high sugar levels to achieve bacterial control and also reveals the use of preservatives of low pH (5-5.5).

In both instances the product produced is not acceptable primarily due to short shelf life and corrosion. Accordingly further investigation has taken place concerning stabilizing such mixtures.

SUMMARY OF INVENTION

Surprisingly, a particular phosphate buffer system has been discovered which has been found to effectively stabilize the mixture by maintaining pH in the range 8.0 to 8.5.

Accordingly, there is provided an aerosol dispensable composition comprising in combination:

(i) 0.05 to 5% w/w of a frothing agent;

(ii) 0.05 to 75% w/w of a sweetener;

(iii) 0.05 to 10% w/w of a thickener;

(iv) 0.01 to 1% w/w of a preservative;

(v) 0.1 to 10% w/w a phosphate buffer system adapted to maintain the pH of the compositions in the range 8.0 to 8.5; and the balance being selected from other excipients, flavours and colourants, propellants and water. Preferably, the phosphate buffer system is present in an amount ranging from 0.1-2.5% w/w. The phosphate buffer system typically comprises a mixture of potassium phosphate and sodium phosphate. This system also allows various types of flavour other than chocolate and stawberry to be also practically incorporated. It will be recognized by one skilled in the art that conventional flavoring agents comprise acidic flavoring agents such as fruit extracts and the like. More particularly the buffer system can comprise a mixture of potassium dihydrogen phosphate and disodium hydrogen phosphate, the ratio of $KH_2PO_4$ to $Na_2HPO_4$ being from 1:60 to 1 to 105.

Testing has shown that a composition of the type disclosed in PCT/AU/85/00135 can be stabilized and no corrosion has been detected either at room temperature or under accelerated high temperature storage conditions. Thus, the product exhibits very long shelf life.

Preferably, the phosphates are blended in the following ratio to maintain the composition pH in the range 8.0-8.5.

$KH_2PO_4$ pH=4.62 as 1% aqueous solution.

$Na_2HPO_4$ pH=9.12 as 1% aqueous solution.

$KH_2PO_4:NaHPO_4::1.0:87.4$

The preferred ingredients for the composition of this invention are as follows:

A. Frothing agent is selected from emulsifiers of the sorbitol ester, glycerol ester or fatty acid sucrose ester types. Most preferred are glycerol monostearate, sorbitol monostearate which generally produce the best foam with the least affect on flavour. The frothing agent also aids in the stable dispersion of the flavour agents.

B. The sweetener may be selected from sweeteners such as saccharine, aspartame, dextrose, fructose or sucrose. Typically artificial sweeteners are used in the range 0.1 to 5% whilst natural sweeteners are normally in the range 5 to 75%. The most reliable sweetener is sucrose and the level of sweetener required is constrained by adequacy in providing sweetening effect at the lower end of the scale and by viscosity and solubility at the upper end of the concentration range. Excessive levels when combined with other excipients can produce crystalline growth in the aerosol cans which results in valve blockages. The most preferred sweetener is sucrose used at a level of between 15%–75%. Typically, a representative formula is

|  | % |
|---|---|
| Flavour | 3.0 |
| Sucrose | 61.0 |
| Water | 28.99 |
| AZO Red Dye | 0.010 |
| Nitrous Oxide | 7.0 |

C. Careful selection of the thickener is required because the product is normally used at a dilution of around 10% and with conventional thickeners such as pectin, tragacanth, the ten-fold concentration in the aerosol product would result in a viscosity that was too high to allow proper dispensing from the aerosol can. Thus, preferred thickeners are gums of polysaccharide type particularly those of a grade which undergo interaction with milk to produce a large increase in milk viscosity after contact. A number of the gums tested showed a tendency to age thicken when stored over a period of time. This aging tendency was reduced by addition of water softening components of the phosphate type. Preferred thickeners are carragheenan, methylcellulose, hydroxypropylcellulose, and general polysaccharides. An example of thickeners follows:

|  | % |
|---|---|
| Flavour | 3.0 |
| Sucrose | 50.0 |
| Water | 45.95 |
| Xathane Gum | 1.0 |
| Sodium Hexametaphosphate | 0.05 |
| Nitrous Oxide | 7.0 |

D. The colouring agents should be present in the range of 0.01 to 5% preferably 0.01 to 1%. Variation of the other components of the composition tends to produce variable affects on colour. Many colours also increase the corrosivity of the formula to the aerosol container. All approved dystuff are suitable. The preferred colouring agents are azodyes of the ponceau 4R, erythroscine, carmoisine, tartrazine type, brilliant blue F.C.F., Brown HT, allura red and a wide range of natural colouring substances. It will be recognized that coloring agents approved for use in food products comprise acidic colorants conventional in the art such as azodyes.

E. Typical examples of the buffer system are as follows:

| Buffer No. 1: | Dipotassium Dihydrogen Phosphate | 77.2% W/W |
|---|---|---|
|  | Potassium Dihydrogen Phosphate | 22.7% W/W |
|  | pH of above combination in water is 8.0 | at 2.2% W/W |
| Buffer No. 2: | Potassium Dihydrogen Phosphate | 79.0% W/W |
|  | Sodium Hydroxide | 21.0% W/W |
|  | pH of above combination in water is 8.1% | at 0.7% |
| Buffer No. 3: | Sodium Dihydrogen Phosphate | 4.3% W/W |
|  | Disodium Hydrogen Phosphate | 95.7% |
|  | pH of above combination in water is 8.0 | at 6.8% |

Each buffer introduces stability and performance to the dispensable composition described. This system ensures microbiostatic, microbiocidal and fungicidal effect and as well reduce corrosion of lacquered tinplate to the point where shelf life in excess of twelve months at 20° C. are now achievable.

F. The balance of the mixture is made up with purified water.

G. The propellant to be used to dispense the composition from the aerosol can will comprise 2 to 50% by weight and can comprise any food approved propellant. Preferably nitrous oxide, carbon dioxide and octaflurocyclobutane, or propane may be used. However, the most preferred propellant is nitrous oxide in order to achieve the optimum performance required for this particular composition. Due to its non-condensable nature a higher pressure can be used to ensure mixing with nitrous oxide than with condensable propellants. In addition, the condensable propellants tend to produce a shaving-cream type foam due to their densities and settle out of the system. Care must be taken if carbon dioxide is used as propellant because it is acidic. However, it could be used where lined aerosol cans are used.

EXAMPLES

| COMPONENT | % W/W |
|---|---|
| EXAMPLE 1 |  |
| Flavour | 0.1–3.0 |
| Sodium Benzoate | 0.01–1.0 |
| Polysaccharide Gum | 0.01–1.0 |
| Dye Stuff | 0.001–0.1 |
| Glyceryl Monostearate | 0.01–1.0 |
| Nitrous Oxide | 0.5–6.0 |
| Sucrose | 20–45 |
| Water | BALANCE |
| Butylated Hydroxy Anisole | 0.001–0.5 |
| Disodium Hydrogen Phosphate | 0.01–2.0 |
| Potassium Dihydrogen Orthophosphate | 0.01–0.5 |
| EXAMPLE 2 |  |
| Flavour | 3.000 |
| Sucrose | 50.000 |
| Sorbitol ester | 2.000 |
| Hydroxy propyl cellulose | 0.080 |
| Buffer No. 1 (aforestated) | 2.200 |
| Colour | 0.008 |
| Water TO | 200% |
| EXAMPLE 3 |  |
| Flavour | 3.000 |
| Sucrose | 50.000 |
| Sorbitol ester | 1.000 |
| Hydroxy propyl cellulose | 0.080 |
| Buffer No. 2 (aforestated) | 0.700 |
| Colour | 0.008 |
| Water TO | 100% |
| EXAMPLE 4 |  |
| Flavour | 3.000 |
| Sucrose | 50.000 |
| Sorbitol ester | 1.000 |
| Hydroxy propyl cellulose | 0.080 |
| Buffer 3 (aforestated) | 6.800 |
| Colour | 0.008 |
| Water TO | 100% |

In each of the examples, testing over a prolonged period of months has failed to reveal any corrosion spoilage or bacterial spoilage.

Aerosol Milk shake compositions utilizing the buffer system achieve a long life and permit a wider range of flavours than previously possible.

We claim:

1. An aerosol dispensable composition comprising in combination:
   (i) 0.05 to 5% w/w of a frothing agent;
   (ii) 0.05 to 75% w/w of a sweetener;
   (iii) 0.05 to 10% w/w of a thickener;

(iv) at least one additive selected from the group consisting of an acidic flavouring agent and an acidic colourant;
(v) a propellant;
(vi) water; and
(vii) a sufficient amount of a phosphate buffer system to maintain the pH of the composition in the range 8.0 to 8.5;

said composition having a shelf life of at least 12 months at ambient temperature in a corrosible metallic or metal lined container.

2. The composition according to claim 1 wherein the phosphate buffer system is present in an amount ranging from 0.1 to 2.5% w/w.

3. The composition according to claim 1 wherein the phosphate buffer system comprises a mixture of potassium phosphates and sodium phosphates.

4. The composition according to claim 1 wherein the phosphate buffer system comprises a mixture of disodium hydrogen phosphate and potassium dihydrogen orthophosphate.

5. The composition according to claim 1 wherein the phosphate buffer system comprises a mixture of potassium dihydrogen phosphate and disodium hydrogen phosphate, the ratio of $KH_2PO_4$ to $Na_2HPO_4$ being from 1:60 to 1 to 105.

6. An aerosol dispensable composition according to claim 1 wherein the frothing agent is selected from emulsifiers of the sorbitol ester, glycerol ester and fatty acid sucrose ester types.

7. An aerosol dispensable composition according to claim 1 wherein the frothing agent is glycerol monostearate and/or sorbitol monostearate.

8. An aerosol dispensable composition according to claim 1 wherein the sweetener is selected from the group of sweeteners including saccharine, aspartame, dextrose and fructose.

9. An aerosol dispensable composition according to claim 1 wherein the sweetener is an artificial sweetener present in amounts from 0.1 to 5%.

10. An aerosol dispensable composition according to claim 1 wherein the sweetener is a natural sweetener present in amounts of from 5 to 75%.

11. An aerosol dispensable composition according to claim 1 wherein the thickener is a polysaccharide gum.

12. An aerosol dispensable composition according to claim 1 wherein an acidic colourant is present in the range of 0.01 to 5%.

13. An aerosol dispensable composition according to claim 12 wherein the acidic colourant is selected from the group of azodyes consisting of ponceau 4R, erythroscine, carmoisine, tartrazine type, brilliant blue F.C.F., brown HT and allura red.

14. An aerosol dispensable composition according to claim 1 wherein the propellant is selected from nitrous oxide, carbon dioxide, octaflourocyclobutane and propane.

15. A method of extending the shelf life of an aerosol dispensable composition, said composition comprising in combination:
(i) 0.05 to 5% w/w of a frothing agent;
(ii) 0.05 to 75% w/w of a sweetener;
(ii) 0.05 to 10% w/w of a thickener
(iv) at least one additive selected from the group consisting of an acidic flavouring agent and an acidic colourant;
(v) a propellant; and
(vi) water;

said process comprising the step of adding a sufficient amount of a phosphate buffer system to stabilize the pH of the composition in the range of 8.0 to 8.5.

16. A method of extending the shelf life of an aerosol dispensable composition, said composition comprising in combination:
(i) 0.05 to 5% w/w of a frothing agent;
(ii) 0.05 to 75% w/w of a sweetener;
(iii) 0.05 to 10% w/w of a thickener;
(iv) at least one additive selected from the group consisting of an acidic flavouring agent and an acidic colourant;
(v) a propellant; and
(iv) water;

said process comprising the steps of adjusting the pH of said composition to within the range of 8.0 to 8.5 and adding a sufficient amount of a phosphate buffer system to maintain the pH as adjusted.

17. An aerosol dispensable composition according to claim 1, wherein said composition further comprises 0.01 to 1% w/w of a preservative.

18. A process according to claim 15, wherein said phosphate buffer system comprises potassium dihydrogen phosphate and disodium hydrogen phosphate in a ratio of $KH_2PO_4$ to $Na_2HPO_4$ of from 1:60 to 1:105.

19. A process according to claim 16, wherein said phosphate buffer system comprises potassium dihydrogen phosphate and disodium hydrogen phosphate in a ratio of $KH_2PO_4$ to $Na_2HPO_4$ of from 1:60 to 1:105.

* * * * *